(12) United States Patent
Bartels

(10) Patent No.: US 9,671,235 B2
(45) Date of Patent: Jun. 6, 2017

(54) VEHICLE NAVIGATION SYSTEM

(71) Applicant: Florian Bartels, Nürnberg (DE)

(72) Inventor: Florian Bartels, Nürnberg (DE)

(73) Assignee: Elektrobit Automotive GmbH (DE)

( * ) Notice: Subject to any disclaimer, the term of this patent is extended or adjusted under 35 U.S.C. 154(b) by 21 days.

(21) Appl. No.: 14/814,574

(22) Filed: Jul. 31, 2015

(65) Prior Publication Data

US 2016/0040994 A1    Feb. 11, 2016

(30) Foreign Application Priority Data

Aug. 6, 2014  (DE) ......................... 10 2014 215 570

(51) Int. Cl.
G01C 21/34 (2006.01)
G01S 19/42 (2010.01)
G01C 21/26 (2006.01)
G01C 21/30 (2006.01)
G01S 19/49 (2010.01)

(52) U.S. Cl.
CPC .............. G01C 21/34 (2013.01); G01C 21/26 (2013.01); G01C 21/30 (2013.01); G01S 19/42 (2013.01); G01S 19/49 (2013.01)

(58) Field of Classification Search
CPC ........ G01C 21/34; G01C 21/26; G01C 21/30; G01S 19/42; G01S 19/49
See application file for complete search history.

(56) References Cited

U.S. PATENT DOCUMENTS

| 6,272,405 B1 * | 8/2001 | Kubota | ................. | G01C 21/12 342/357.31 |
| 6,397,147 B1 * | 5/2002 | Whitehead | ............. | G01C 21/36 701/432 |

(Continued)

FOREIGN PATENT DOCUMENTS

DE    4130367 A1    3/1992
DE    19856187 A1    6/2000
(Continued)

OTHER PUBLICATIONS

Merriam-Webster's Collegiate Dictionary 10th Edition, 1993, all pages.*

(Continued)

Primary Examiner — Calvin Cheung
(74) Attorney, Agent, or Firm — Tarolli, Sundheim, Covell & Tummino LLP

(57) ABSTRACT

A method for operating a navigation device. The navigation device carries out a position determination on the basis of received signals. In parallel, another position determination is carried out on the basis of signals from inertial sensors. These two determined positions are compared. If these two determined positions differ by more than a predetermined amount, which has been defined by a predetermined limit value, an error value is recognized. If an impermissible deviation is recognized, then especially the direction of movement, the speed differences and the position changes are taken into account. When the error value is recognized, shaded areas in the surroundings of the vehicle are determined and associated with the determined momentary position, as a result of which an association with a lane level is carried out.

12 Claims, 2 Drawing Sheets

(56) References Cited

U.S. PATENT DOCUMENTS

Figure 1:
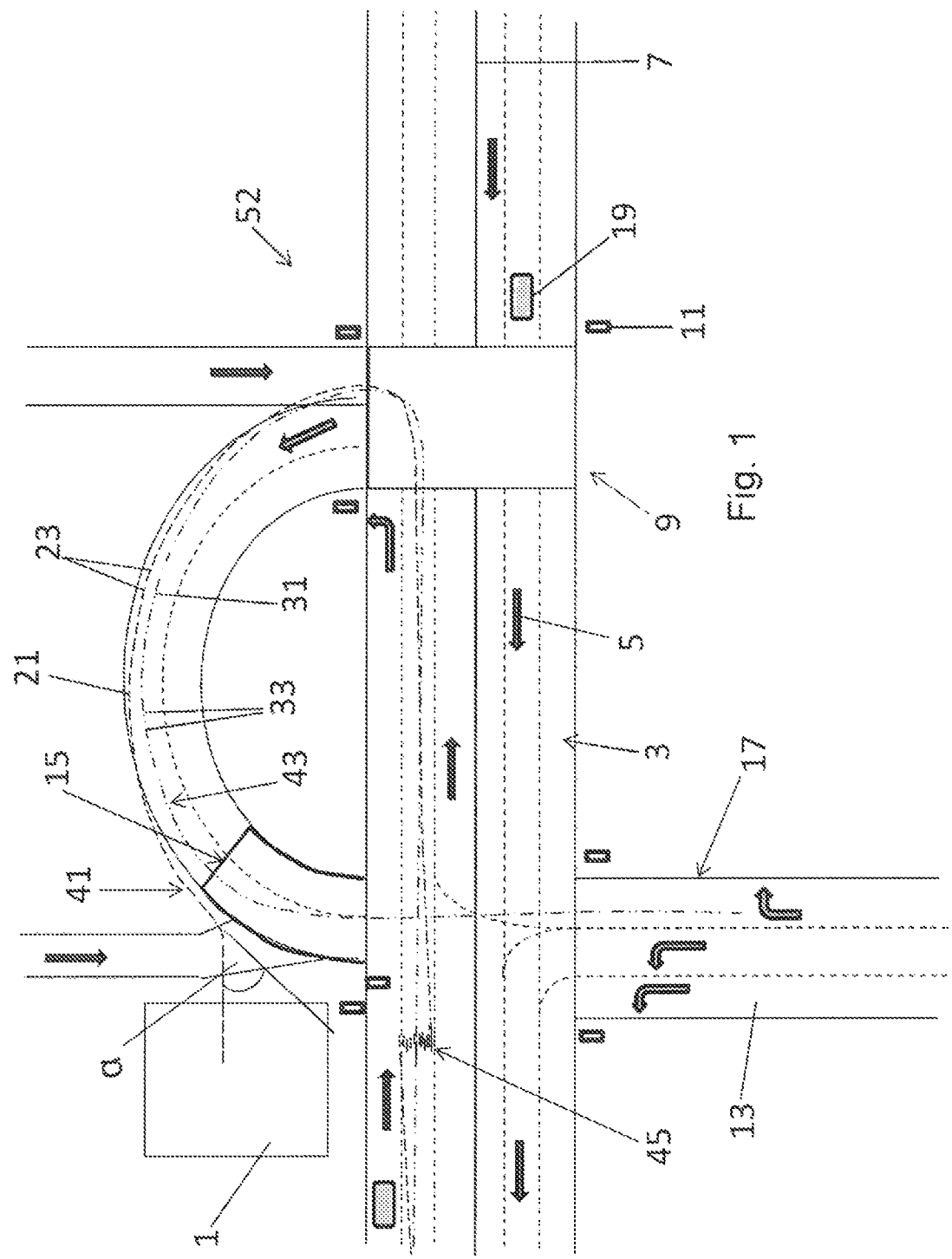

| | | | |
|---|---|---|---|
| 8,935,121 B2 * | 1/2015 | Hollenstein | G01C 22/025 701/41 |
| 9,366,540 B2 * | 6/2016 | Chien | G01C 21/26 |
| 2006/0271295 A1 | 11/2006 | McLaren et al. | |
| 2009/0146864 A1 * | 6/2009 | Zank | G01S 1/245 342/22 |
| 2011/0128183 A1 * | 6/2011 | Marshall | G01S 5/0252 342/357.29 |
| 2012/0188121 A1 * | 7/2012 | Xie | G01S 19/42 342/357.31 |
| 2012/0209519 A1 * | 8/2012 | Basnayake | G01C 21/32 701/457 |
| 2012/0309411 A1 * | 12/2012 | MacGougan | H04W 64/006 455/456.1 |
| 2013/0196593 A1 * | 8/2013 | Roper | H04B 13/02 455/40 |
| 2014/0149030 A1 * | 5/2014 | Chapman | G01C 21/3691 701/119 |
| 2014/0270345 A1 * | 9/2014 | Gantman | G06T 7/004 382/103 |
| 2016/0061957 A1 * | 3/2016 | Li | G01S 5/0263 342/357.42 |

FOREIGN PATENT DOCUMENTS

| | | |
|---|---|---|
| DE | 10008061 A1 | 9/2001 |
| DE | 102007041121 A1 | 3/2009 |
| EP | 0724136 A1 | 7/1996 |
| EP | 1550840 A1 | 7/2005 |
| EP | 1983303 A1 | 10/2008 |

OTHER PUBLICATIONS

German Examination Report for corresponding DE102014215570.3 dated Mar. 20, 2015.

* cited by examiner

VEHICLE NAVIGATION SYSTEM

RELATED APPLICATIONS

The present invention claims priority to Serial No. DE 10214215570.3, filed 6 Aug. 2014, the entirety of which is incorporated herein by reference.

The present invention relates to a method for processing sensor data for a vehicle navigation system. The navigation system comprises a receiver for receiving position signals, especially satellite signals, in order to determine an absolute position of the vehicle. Another position determination is carried out based on sensor signals from inertial sensors. When an error value has been exceeded, the navigation procedure is continued, making use of the signals from the inertial sensors.

German patent application DE 10 2007 041 121 A describes a method for processing sensor data for the assistance system of a vehicle. In this vehicle assistance system, a first sensor picks up a measured value and transmits it to a processing unit. This measured value is used to determine the absolute position. An error is associated with this measured value. A second sensor picks up a measured value by means of which the error associated with the first measured value can be adjusted. A third sensor can be provided which allows a redundant determination of the first measured value. When an error associated with the first measured value is exceeded beyond a limit value, it can be provided that the processing unit uses the sensor data supplied by the third sensor in order to continue to determine the position of the vehicle. In this process, the first sensor determines the position of the vehicle by means of satellite navigation. The second sensor detects objects that degrade the satellite signals. Sources of error that especially can cause shading of the satellite signals are sound-protection walls, bridges, tunnels and tall buildings. The third sensors can use wheel speeds, the yaw rate, and the crosswise acceleration, or else a camera in order to determine the relative movement of the vehicle.

European patent document EP 1 550 840 relates to a device and a method for determining the position of a moving vehicle. GPS signals are used to determine the absolute position of the vehicle. If the quality of the GPS signals falls outside of a tolerance range, then the position of the vehicle is determined on the basis of the detected speed and the direction of the vehicle. Wheel sensors can be used to determine the speed and the direction. When the GPS signal is within the tolerance range, a calibration of the wheel sensors, for example, can be carried out. It is the intention of this publication to improve the position determination of a vehicle.

European patent specifications EP 1 983 303 B1 and EP 0 724 136 B1 disclose vehicle navigation systems in which the brightness of the display of the navigation system is regulated as a function of the GPS radio signals received or as a function of the GPS data quality. In particular, it is known from European patent specification EP 0 724 136 B1 to autonomously activate a tunnel mode when the number of received satellite signals has dropped to zero.

Especially in major metropolitan areas, more and more roads are being built one above the other. Thus, if the position of a vehicle is recognized, but if it is not taken into account that the vehicle is on an elevated roadway or in a tunnel, then it can happen that, as a result, erroneous navigation instructions are given by the navigation system.

It is a drawback that an erroneous value is only recognized once there is no longer a GPS signal, and only then is a navigation procedure carried out that is based on a position determination, which differs from the GPS position determination.

The objective of the invention is to improve the navigation.

Moreover, the invention is based on the objective of putting forward a method for the early recognition that the vehicle is being driven in a shaded area such as in a tunnel or on an elevated roadway.

The objective of the invention is achieved by the method according to claim 1.

In the method according to the invention, it is provided that the position and movement are determined on the basis of the position signals such as, for example, GPS signals, received by the navigation system. Throughout this entire document, the term GPS is used by way of an example for any global navigation satellite system (GNSS). The navigation system can be located, for instance, in a vehicle. In this manner, the position and the movement of the vehicle are determined through the modality of a position determination.

Furthermore, the navigation system receives sensor signals from inertial sensors and carries out a second position determination based on these sensor signals. The sensor data from inertial sensors represents relative movements.

Modern vehicles already have numerous inertial sensors that are needed by other systems such as, for example, the braking system, as well as for controlling the running gear. These include, among other things, wheel sensors, acceleration sensors, inertial reference sensors, yaw-rate sensors, and steering angle sensors. Based on the signals of the inertial sensors, the navigation system carries out a second position determination. This position determination is a relative position determination, that is to say, this position determination indicates the extent to which the position has changed between two points in time.

The positions determined on the basis of the position signals received in a given time sequence yield a first movement line, while the positions determined on the basis of the signals of the inertial sensors in a given time sequence yield a second movement line. The method provides that the first and second determined movements, represented by the first and second movement lines, are compared. The comparison is always carried out for identical time spans. Exactly identical points in time are technically often not possible; the inertia movement is usually calculated at a relatively high frequency, that is to say, for example, 10 times per second or more. The GPS movement is typically only calculated once per second. The error or difference over time can be calculated, for example, by interpolation. Interpolation can be dispensed with if a resultant position error is not relevant. Using this approach, a comparison can be carried out for identical time spans.

It can be provided that the employed sensor signals of the inertial sensors and also the received sensor signals are provided with a time stamp and the positions determined on the basis of these signals are provided with the identical time stamp. It can also be provided that the sensor signals arriving in the navigation device are provided with a time stamp and that this time stamp is taken as the basis for the comparison.

If, during this comparison, it is detected that at least one predetermined limit value has been exceeded, then the shaded areas in the surroundings of the vehicle are determined on the basis of a road data network. Here, numerous predetermined limit values can be stored in the navigation system.

The surroundings of the vehicle comprise at least the second movement line, preferably the first and the second movement lines, as of the moment when the limit value was exceeded. Preferably, the determination of shaded areas in the surroundings of the vehicle comprises the area encompassed by the first and second movement lines plus a boundary area surrounding this area. In particular, it has proven to be advantageous to carry out a determination of shaded areas in the surroundings of the vehicle comprising the second movement line after the limit value has been exceeded. Here, the second movement line can be continued, for example, starting from a position determination of the first movement line at which the limit value had not yet been exceeded. This can be, for example, starting from a position determination on the basis of the position signals received within 1 to 5 or even 20 seconds before it is detected that the limit value has been exceeded. It can also be provided to continue the navigation procedure by using a position determination 100 meters before the limit value was exceeded or 10 seconds before the limit value has been exceeded. As a result, the precision of the position determination based on the signals of the inertial sensors is improved. Moreover, this approach also leads to an improved selection of a shaded area.

It has proven to be advantageous to link several limit values above a minimum speed of 2 km/h to additional conditions. Particularly at low speeds, a position determination based on received position signals exhibits abrupt deviations. A restriction to a speed of more than 2 km/h minimizes the frequency with which a limit value is exceeded. As a result, errors that occur, especially when at a standstill, can be ignored. This keeps to a minimum the cases in which it is detected that the error value has been exceeded without the position being located in a shaded area.

It has proven to be advantageous to detect that the limit value has been exceeded if the following applies:

$$vDR > 2 \text{ km/h} \tag{1}$$

and $$|vGPS - vDR| > 5 \text{ km/h} \tag{2}$$

or $$|vGPS - vDR| > 0.5 \times vDR \tag{3},$$

wherein vDR is the speed that can be derived from the second movement line. This determined speed is based on the signals of the inertial sensors, which are also referred to as inertial reference sensors. Here, vGSP is the speed that is determined on the basis of received signals. These speeds can also be derived from the first and the second movement lines. Particularly if GPS signals are used as the received position signals, then this is the speed determined on the basis of the GPS signals received. Owing to the condition according to Formula (3), a large difference is recognized between the speed determined on the basis of the received signals and the speed determined on the basis of the inertial signals relative to the speed determined on the basis of the inertial signals.

It has proven to be advantageous that, at $vDR > 2$ km/h and $|dGPS - dDR| > 20$ m (4), it is recognized that the limit value has been exceeded. The presence of these conditions is seen as an indication of a position in a shaded area. Here, dGPS is the distance between two consecutive positions determined on the basis of received position data, and dDR refers to the distance between two consecutive positions determined on the basis of signals from the inertial sensors. Under these conditions, it is assumed that consecutive positions are determined at the same points in time. By checking the road data network for shaded areas, a vehicle position in a shaded area can be recognized at an early point in time.

Moreover, it has proven to be advantageous that, at
$$vDR > 2 \text{ km/h and } |\Delta HGPS - \Delta HDR| > 10° \tag{5},$$

it is recognized that the limit value has been exceeded. Here, H stands for heading, and with Formula (5), a drifting or jumping of the first movement line relative to the second movement line is recognized. Heading is a technical term for the direction in which a vehicle is pointing. As a rule, heading refers to the angle of the vehicle relative to the North Pole. When a car is driving in reverse, the difference between the heading and the direction of movement, namely, 180°, is the most obvious. The GPS reports the direction of movement in the usual manner relative to the WGS84 coordinate system whose north corresponds to the geographic north. It applies that $\Delta HGPS = HGPS(i+n) - HGPS(i)$, that is to say, a change in the reported direction H over time, namely, 1 . . . N seconds.

The change in direction over N seconds is determined according to the GPS and inertial sensors, and these two changes in direction are compared to each other. This allows drifting to be recognized. For example, the vehicle is driving in a circle to go into a tunnel at 2° per second. The GPS signal reports a constant direction since the signal has dropped; then, after 5 seconds, a direction change difference of 10° has been reached or at N=6, a threshold value of 10° has been exceeded. It has proven to be advantageous to take an area of 200 meters into consideration. As an alternative, it can be provided that a period of time of up to 10 seconds, especially even up to 20 seconds, is taken into consideration.

In an advantageous embodiment, it is provided that, at a difference in the turning speed of more than 5° per second, it is recognized that the predetermined limit value has been exceeded. The following applies:

$$|\text{direction change per unit of time (GPS)} - \text{direction change per unit of time (DR)}| > 5°/s \tag{6}.$$

On the basis of consecutive GPS data (direction of movement), it can be calculated how fast the vehicle is turning according to the GPS. The turning speed can likewise be determined from inertial reference sensors or else measured directly, for example, by means of a gyroscope in the ESP or navigation control unit. The two turning speeds can be compared.

It has proven to be advantageous to consider a jump at very low speeds as an indication of a shaded area. Precisely at low speeds, it is very difficult to recognize shaded areas. In this context, especially the following conditions have proven to be suitable for verifying a limit value at low speeds:

$$vDR \leq 10 \text{ km/h} \tag{7}$$

$$|dGPS - dDR| > 50 \text{ m} \tag{8}$$

If a shaded area has been determined, the momentary vehicle position is associated with the shaded area. It has proven to be advantageous, especially if several shaded areas have been determined in the surroundings of the vehicle, to make a selection based on the second position determination and especially preferably to select a shaded area that is in the area of the second movement line.

Below, the invention will be explained in greater detail on the basis of the embodiment shown schematically in the drawing.

Figure 2:
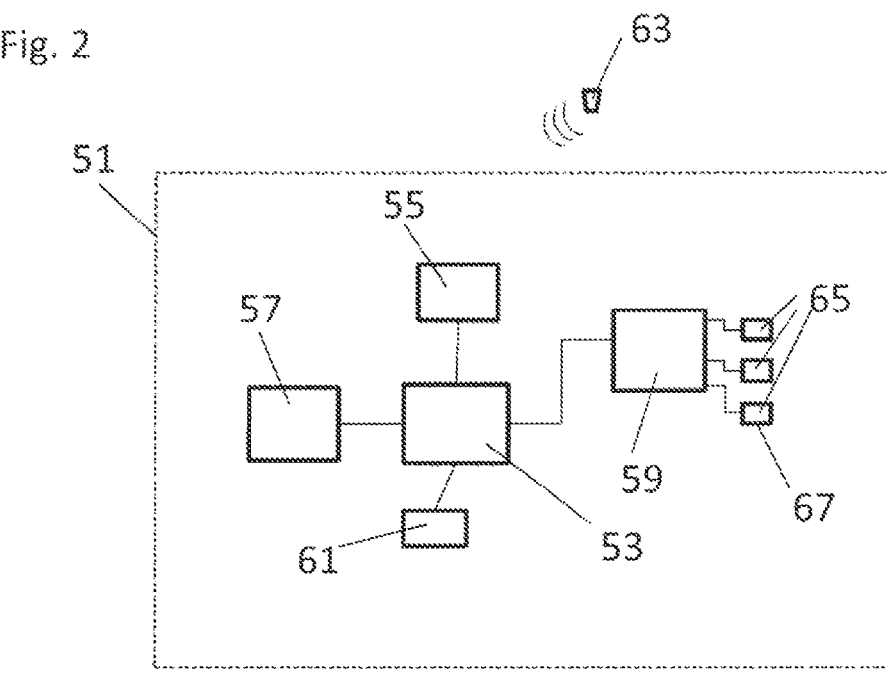
Figure 3:
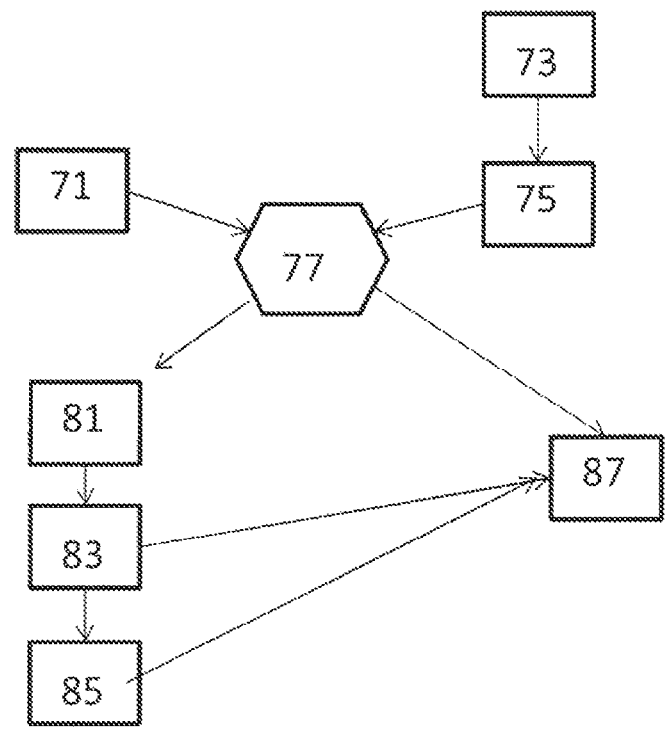

The following is shown:

FIG. 1 view of the surroundings of the vehicle with a position determination,

FIG. 2 navigation device,

FIG. 3 schematic depiction of the navigation method.

In FIG. 1, a section of a road data network 52 is shown in a graphic view that is stored in electronic form in the navigation device 51. A vehicle 19 on a lane 3 is shown in this section by way of an example. The depicted section shows traffic driving on the left side of the road. Of course, the system functions in the same way for traffic driving on the right side of the road. The driving direction 5 or the lane with the associated driving direction are shown with arrows. The lane is marked with a center line 7 to demarcate the different driving directions. The individual lanes are indicated by a broken line. Traffic lights 11 serve to regulate the traffic at intersections 9.

The movement of a vehicle (not shown in the drawing) detected by the navigation system is marked by a second movement line 43 in a repeating pattern made up of a dash followed by two dots. Each dash 33 and each subsequent two dots 33 represent a determined position based on inertial sensor data. An individual determined position 31 on the second movement line 43 is marked by way of an example.

Moreover, a first movement line 41 is shown. The first movement line is shown in the form of a broken line, whereby each dash represents a determined position 21 based on received GPS data as the position data. Two consecutive determined positions are marked with reference numerals 23.

It can be seen that the positions determined on the basis of the GPS signal drift in the shade of the building 1 and continuously deviate from the vehicle position determined by means of the inertial sensors. This deviation, however, is so small that none of the conditions have yet been met indicating that a limit value has been exceeded and consequently, an error value has not yet been exceeded. In a standstill position 45 in front of one of the traffic lights 11, the position determined on the basis of GPS signals jumps around the position determined by the inertial sensors. At a standstill, the limit values at which a limit value is considered to have been exceeded have been set at 50 meters, and this deviation is selected to be so large that here, too, the error value is not exceeded. After the vehicle drives away from the traffic light, the first movement line 41 approaches the second movement line 43. The vehicle now turns to the left off the road and moves in a semi-circle towards a tunnel entrance 15. Initially, the first movement line differs from the second movement line 43. However, this difference does not yet led to the limit value being exceeded. Only after the tunnel entrance does the first movement curve drop. The determined positions of the first movement curve are very close together. The first movement line and the second movement line enclose an angle α. This angle α is so large that the limit value has been exceeded and the determination of shaded areas in the surroundings of the vehicle is initiated. On the basis of the existing road data network, the tunnel is determined and the position is associated with the tunnel lane. The tunnel is a shaded lane 17 that continues underneath an elevated road 13 as a lower lane 17. In the example shown, a relationship between the position determined by the inertial sensors and the road data network had already been established at an earlier point in time, so that a navigation procedure based on the position determined by the inertial sensors and on the movement can be directly continued. Such a relationship of the second movement line 43 can be established, for example, if the quality of the received position signals is excellent.

The navigation device is described in greater detail on the basis of FIG. 2. The navigation device 51 has a signal receiving means 55 to receive position signals. These position signals can be GPS signals that come from several GPS satellites, whereby only one GPS satellite 63 is shown by way of an example. The received position signals are fed to a processor unit 53 by the signal receiving means 55. On the basis of these signals, the processor unit 53 determines a GPS position 21. In order to determine the GPS position, the GPS direction and/or the GPS speed, there can also be a separate processor, which can be present in the signal receiving means 55. Moreover, a position determination unit 59 feeds position signals and movement signals to the processor unit 53, and said position determination unit 59 is in signal communication with inertial sensors 65, preferably at least with inertial reference sensors 67. A position determination is carried out by the position determination unit 59 based on the signals fed by the inertial sensors 65 to the position determination unit. The position determination unit 59 can also be a component of the processor unit 53.

The method for operating the navigation device with early recognition of shaded areas or shaded lanes 17 is described in greater depth with reference to FIG. 3.

The navigation device 51 receives GPS signals in the form of position signals—Method Step 73. The momentary position is determined on the basis of these GPS signals—Method Step 75. Each position determined in this manner, especially the position, the speed and the direction of movement, is compared—Method Step 77—to the applicable data that was determined by means of inertial sensors—Method Step 71. If this comparison reveals that a predetermined limit value has been exceeded, then it is recognized that the error value has been exceeded—Method Step 81. Once it has been recognized that the error value has been exceeded, then a determination of shaded areas is triggered—Method Step 83. If no shaded areas are detected by making a comparison with the map material in the surroundings of the vehicle, then the fact that the error value has been exceeded is interpreted as being a temporary disturbance that could be due to, for example, a large truck driving next to the vehicle or due to sound-protection walls. Then the normal navigation procedure according to Method Step 87 can be continued. However, if shaded areas or a shaded lane are detected, then the momentary vehicle position is associated with the shaded area, for example, under an elevated road or in a tunnel—Method Step 85. If several shaded areas were determined in the surroundings of the vehicle, then the shaded area selected is the one whose orientation corresponds to the vehicle movement and/or that comes closest to the momentarily determined position based on the signals of the inertial sensors. Through the association with a shaded area, it is specified on which level the vehicle is located, as long as there is only one shaded area and one open level. Subsequently, the navigation procedure can be continued on the basis of the momentary position.

If there are several shaded areas, then a plausibility check is carried out on the basis of the route that has been traveled so far. Based on the plausibility check, an association of the momentary position with a level is made and subsequently, the navigation procedure is resumed.

In summary, particularly the following preferred features of the invention are pointed out:

Method for operating a navigation device 51. The navigation device 51 carries out a first position determination 75 on the basis of received signals. In parallel, another position determination 71 is made based on signals from inertial sensors. These two determined positions are compared. If these two determined positions deviate from each other by more than a predetermined amount, which has been defined by a predetermined limit value, an error value is recognized. If an impermissible deviation is recognized, then especially the direction of movement, the speed differences and the position changes are taken into account. In the case of recognized detected error values, shaded areas in the surroundings of the vehicle are determined and they are associated with the determined momentary position, so that consequently, an association is made with a driving level.

LIST OF REFERENCE NUMERALS 1 building
3 lane
5 lane direction
7 middle line
9 intersection
11 traffic light
13 elevated road
15 tunnel entrance
17 lower lane/shaded lane
19 vehicle
21 GPS position
23 consecutive GPS positions
31 position determination based on inertial sensors
33 consecutive positions based on inertial sensors
41 first movement line
43 second movement line
51 navigation device
52 road data network (graphic depiction)
53 processor unit
55 signal receiving means
57 road network database
59 position determination unit (inertial sensors)
61 speech output means/output means
63 GPS satellite
65 inertial sensors
67 inertial reference sensors
71 determination of the position based on signals from inertial sensors
73 reception of GPS signals
75 determination of the vehicle position based on GPS signals
77 comparison of the determined vehicle movements
81 error value exceeded
83 determination of the shaded areas
85 association of the vehicle position with a shaded area
87 output of navigation instructions

The invention claimed is:

1. A method for operating a navigation device for a motor vehicle said method comprising:
receiving position signals from a satellite navigation system,
executing a first position determination based on said received signals,
executing a second position determination based on sensor signals received from a plurality of inertial sensors, wherein in order to determine that an error value has been exceeded,
determining a first movement line of the motor vehicle on the basis of the first position determination, and
determining a second movement line of the motor vehicle on the basis of the second position determination,
comparing the first movement line to the second movement line for identical time spans, and
positively determining based on the comparison at least one predetermined limit value has been exceeded, recognizing that the error value has been exceeded,
whereby positively determining the error value has been exceeded,
continuing a navigation procedure based on the second position determination,
determining shaded areas in an area surrounding the motor vehicle on the basis of a road data network, wherein the area surrounding the motor vehicle comprises the second movement line, and
after determining a shaded area in the area surrounding the motor vehicle, associating a momentary vehicle position with the shaded area.

2. The method according to claim 1, characterized in that
a shaded area is associated with a lane level and the navigation procedure is continued, taking the lane level into consideration.

3. The method according to claim 1, characterized in that
the second movement line is continued starting from a position determination of the first movement line at which the error value had not been exceeded.

4. The method according to claim 1, characterized in that
a predetermined limit value is exceeded if a speed—indicated by the second movement line (vDR)—is greater than 2 km/h and if the following applies:

$|vGPS-vDR|>5$ km/h or $|vGPS-vDR|>0.5 \times vDR$, wherein vGPS is the speed indicated by the first movement line and vDR is the speed indicated by the second movement line at same measuring times.

5. The method according to claim 1, characterized in that
a predetermined limit value is exceeded if a speed of the second movement line (vDR) is greater than 2 km/h and
$|dGPS-dDR|>20$ m is fulfilled at same measuring times wherein dGPS is a distance between two measuring points of the first movement line and dDR is a traveled distance between two measuring points of the second movement line.

6. The method according to claim 1, characterized in that
a predetermined limit value is exceeded if a speed indicated by the second movement line (vDR) is greater than 2 km/h and
applying that $|\Delta HGPS-\Delta HDR|>10°$ wherein $\Delta HGPS=HGPS(i+n)-HGPS(i)$ and $\Delta HDR=HDR(i+n)-HDR(i)$ over the time $n=1 \ldots N$, wherein H refers to a direction in which the motor vehicle is pointing.

7. The method according to claim 1, characterized in that
a predetermined limit value is exceeded if a speed (vDR) of the second movement line is smaller than or equal to 10 km/h, preferably 5 km/h, and an absolute value of the difference between the distance (dDR) of two consecutive determined positions of the second movement line and the distance (dGPS) of two consecutive determined positions of the first movement line exceeds a value of 50 m.

8. The method according to claim 1, characterized in that a predetermined limit value is exceeded if a vehicle direction indicated by the first movement line differs by more than 10° from the vehicle direction indicated by the second movement line.

9. The method according to claim 1, characterized in that, if at least one shaded area in the surroundings of the vehicle is determined, the orientation of the at least one shaded area is compared to the second movement line, and the momentary vehicle position is associated with the at least one shaded area if an orientation of the at least one shaded area corresponds to the second movement line of the vehicle within defined orientation limit values.

10. The method according to claim 1, characterized in that the second movement line is determined at least by using signals from inertial reference sensors.

11. The method according to claim 1, characterized in that the determination of shaded lane areas in the surroundings of the momentary vehicle position based on the momentary position of the second movement line is made by using road network information from a road network database.

12. The method according to claim 1, characterized in that the first position determination is carried out in a time span of equal-length time spans or the second position determination is carried out in a time span of equal-length time spans.

* * * * *